United States Patent
Gehring et al.

(10) Patent No.: US 6,830,511 B2
(45) Date of Patent: Dec. 14, 2004

(54) AIR DUCT OUTLETS WITH REMOTELY-LOCATED JOYSTICK LOUVER CONTROLS

(75) Inventors: Thomas F. J. Gehring, Ontario (CA); Ireneusz Jankowski, Ontario (CA); Dejan Havidic, Toronto (CA); Jeffrey A. McKerrall, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 63 days.

(21) Appl. No.: 10/442,772

(22) Filed: May 21, 2003

(65) Prior Publication Data

US 2004/0142653 A1 Jul. 22, 2004

Related U.S. Application Data

(60) Provisional application No. 60/441,449, filed on Jan. 21, 2003.

(51) Int. Cl.[7] .................................................. B60H 1/34
(52) U.S. Cl. ........................................ 454/155; 454/152
(58) Field of Search ................................. 454/143, 152, 454/155, 256, 69; 165/41, 42

(56) References Cited

U.S. PATENT DOCUMENTS

| | | | |
|---|---|---|---|
| 3,456,574 A | 7/1969 | Jakeway | 98/121 |
| 3,552,295 A | 1/1971 | Armstrong | 98/110 |
| 3,701,311 A | 10/1972 | McLarty | 98/110 |
| 4,006,673 A | 2/1977 | Meyer et al. | 98/40 |
| 4,345,510 A | 8/1982 | Sterett | 98/40 |
| 4,621,570 A | 11/1986 | Bolton et al. | 98/114 |
| 4,702,156 A | 10/1987 | Sano | 98/40.24 |
| 5,069,112 A * | 12/1991 | Takayama et al. | 454/162 |
| 5,230,655 A | 7/1993 | Thompson et al. | 454/202 |
| 5,480,350 A | 1/1996 | Naruse | 454/155 |
| 6,159,092 A | 12/2000 | Elder | 454/155 |
| 6,386,965 B1 | 5/2002 | Greenwald et al. | 454/75 |
| 6,394,891 B1 * | 5/2002 | Arold | 454/155 |
| 6,435,962 B1 | 8/2002 | Herron et al. | 454/290 |
| 6,652,371 B2 * | 11/2003 | Kamio | 454/155 |
| 6,736,719 B1 * | 5/2004 | Gehring et al. | 454/155 |

* cited by examiner

Primary Examiner—Derek S. Boles
(74) Attorney, Agent, or Firm—Myers Bigel Sibley & Sajovec

(57) ABSTRACT

Air duct outlets having remotely located joystick controls are provided. A first set of generally parallel louvers are pivotally connected in spaced-apart adjacent relationship. A second set of generally parallel louvers are pivotally connected in spaced-apart adjacent relationship in an upstream location from the first set of louvers. A joystick is remotely positioned and does not interfere with air flowing through the outlet. The joystick is operably coupled with the first and second sets of louvers and is configured to pivot the first and second sets of louvers in response to user movement thereof.

18 Claims, 4 Drawing Sheets

AIR DUCT OUTLETS WITH REMOTELY-LOCATED JOYSTICK LOUVER CONTROLS

RELATED APPLICATION

This application claims the benefit of U.S. Provisional Application No. 60/441,449, filed Jan. 21, 2003, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable louvers. In addition, air duct outlets may be provided with dampers for allowing vehicle occupants to control the amount of air flowing therethrough.

Various types of air duct outlets can be provided depending upon special functions, air directability and design constraints within the vehicle. See, for example, U.S. Pat. Nos. 4,345,510; 4,702,156; and 4,006,673. Vehicle manufacturers are continuously seeking components, such as air duct outlets, that have enhanced functionality and durability, yet are cost effective to manufacture.

SUMMARY OF THE INVENTION

In view of the above discussion, air duct outlets having remotely located joystick controls are provided. According to embodiments of the present invention, an air duct outlet includes a housing having a front wall with an opening therein through which air is allowed to flow. A louver assembly is operably coupled with the housing and is configured to adjust the direction of air flowing through the front wall opening. The louver assembly includes a first set of generally parallel louvers that are pivotally secured within the housing in spaced-apart adjacent relationship, and a second set of generally parallel louvers pivotally secured within the housing in spaced-apart adjacent relationship. The second set of louvers are positioned upstream from the first set of louvers within the housing.

The louvers in the first set are operably connected together such that pivotal movement of any one of the louvers in the first set causes pivotal movement of the remaining louvers in the first set. Similarly, the louvers in the second set are operably connected together such that pivotal movement of any one of the louvers in the second set causes pivotal movement of the remaining louvers in the second set. The louvers in the first set pivot about generally parallel axes. Similarly, the louvers in the first set pivot about generally parallel axes. The pivot axes of the first and second sets of louvers are substantially transverse and may be substantially orthogonal.

A joystick is remotely positioned relative to the front wall opening and does not interfere with air flowing through the front wall opening. The joystick is operably coupled with the first and second sets of louvers and is configured to pivot the first and second sets of louvers in response to user movement thereof. According to embodiments of the present invention, the joystick may extend from the front wall of the housing via a second opening formed therein.

According to other embodiments of the present invention, a remotely located joystick is provided that does not interfere with air flowing through the front wall opening and that produces output signals responsive to user movement thereof. A first servomotor is operably coupled with a louver in the first set of louvers and is configured to cause pivotal movement of the first set of louvers in response to selected user movement of the joystick. A second servomotor is operably coupled with a louver in the second set of louvers and is configured to cause pivotal movement of the second set of louvers in response to selected user movement of the joystick. The joystick can be at virtually any location within a vehicle and is not limited to being adjacent the front wall opening.

Air duct outlets according to embodiments of the present invention allow for improved air flow directability because a user's hand does not interfere with the air stream coming from the outlet. Moreover, because the joystick control is no longer positioned within the air stream (and thereby blocking air flow), the effective outlet opening is increased. Accordingly, louvers within air duct outlets according to embodiments of the present invention can be smaller than conventional air duct outlet louvers, and without inducing pressure drops.

Air duct outlets according to embodiments of the present invention can facilitate new and improved styling opportunities for vehicle manufacturers and other manufacturers. Air duct outlets according to embodiments of the present invention are not limited to uses within vehicles (e.g., automobiles, trucks, boats, aircraft, etc.), but may also be utilized in residential and commercial heating, ventilating and air conditioning (HVAC) applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
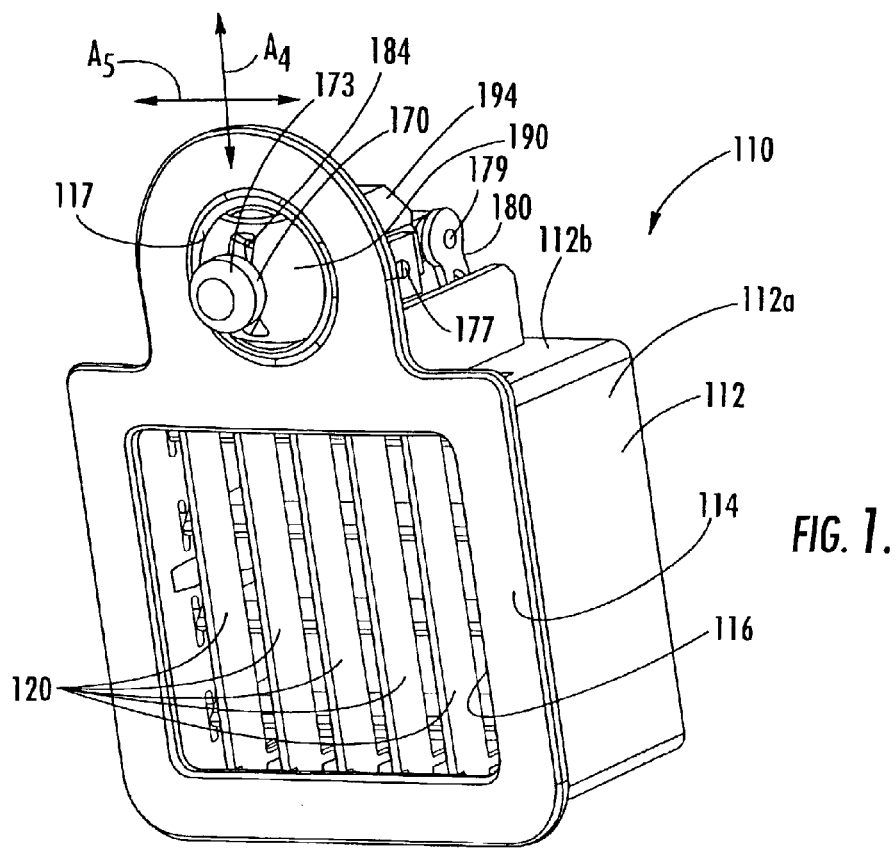
FIG. 1 is a front, perspective view of an air duct outlet, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
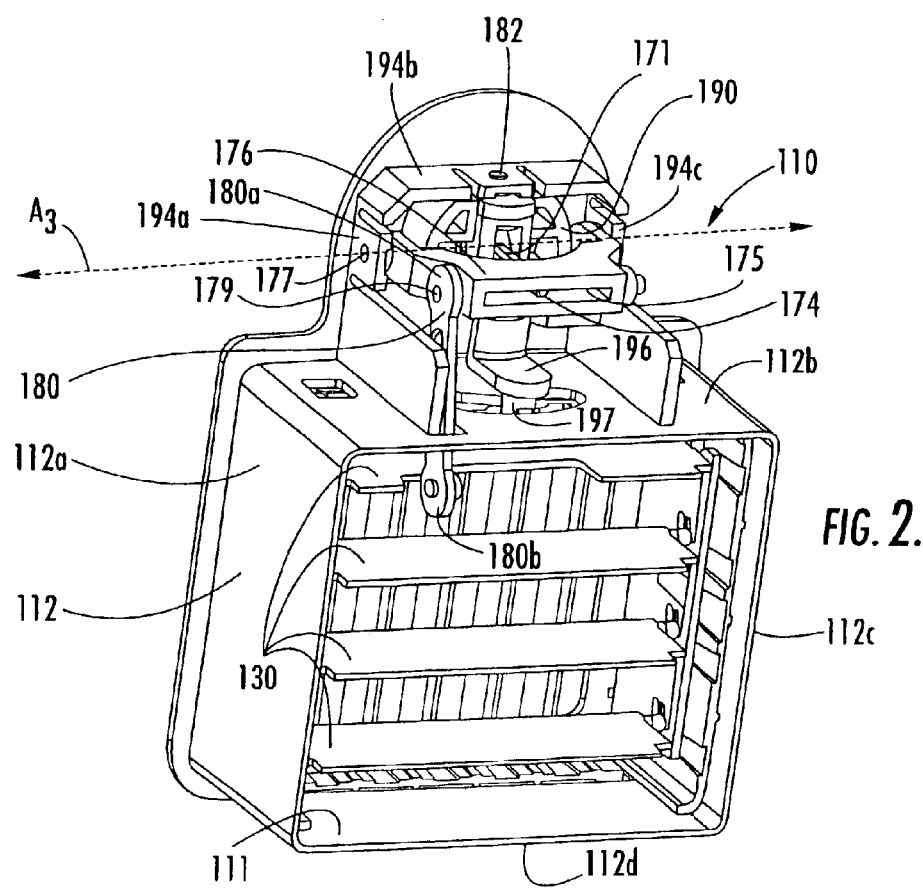
FIG. 2 is a rear, perspective view of the air duct outlet of FIG. 1.
Figure 3:
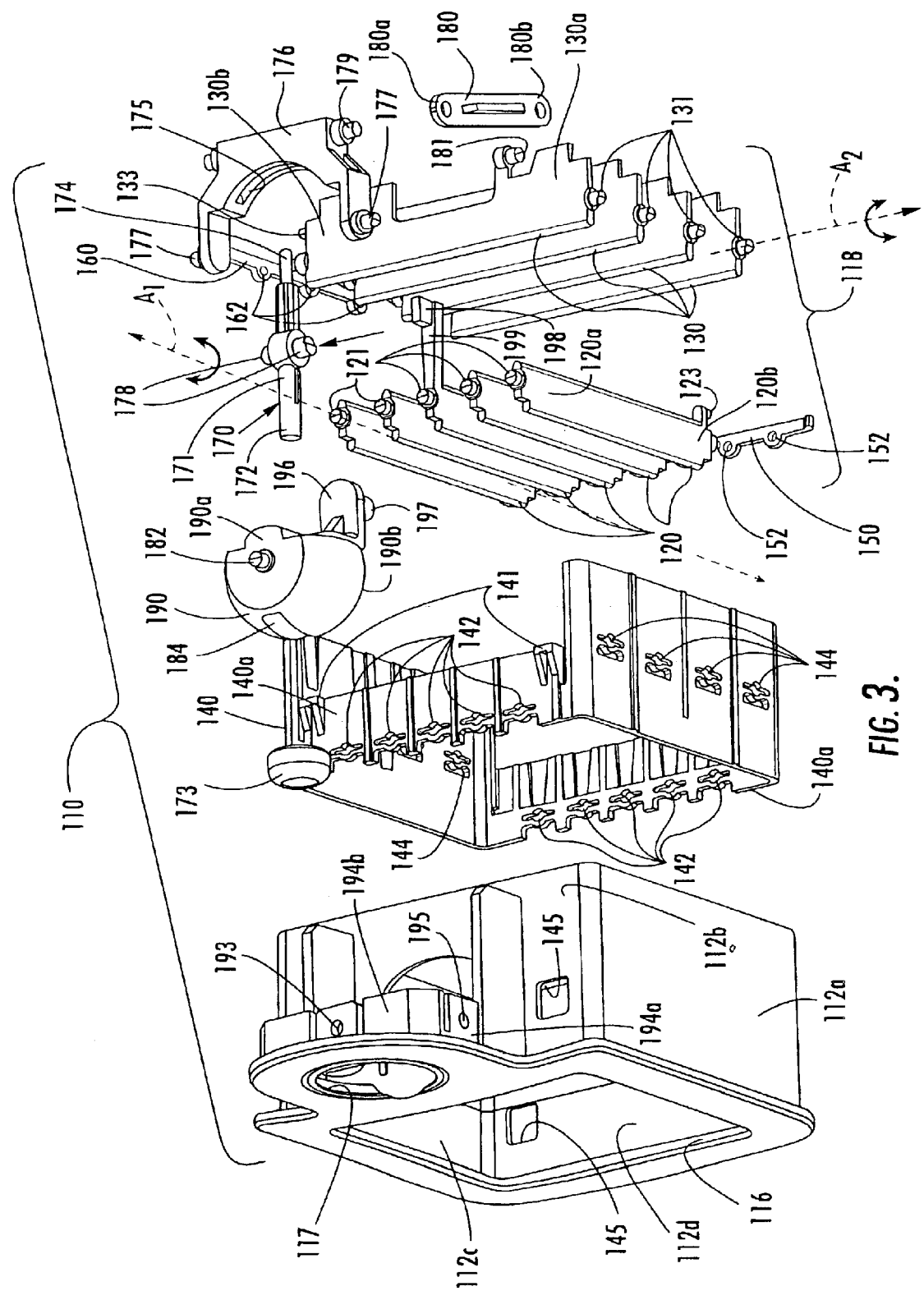
FIG. 3 is an exploded, perspective view of the air duct outlet, of FIG. 1.

Referring to FIGS. 1–3, an air duct outlet 110, according to embodiments of the present invention, is illustrated. The illustrated air duct outlet 110 is designed for use within passenger compartments of vehicles, such as automobiles, trucks, trains, boats, aircraft, and the like. However, it is understood that air duct outlets according to embodiments of the present invention may be utilized in various environments and are not limited to use in vehicles.

The illustrated air duct outlet 110 includes a housing 112. The housing 112 includes a front wall 114 having a first opening 116 therein that allows air to pass therethrough. A remotely-located joystick 170 extends through a second opening 117 in the front wall 114, as illustrated, and is utilized to adjust air flow as described below. As would be understood by those skilled in the art, the air duct outlet 110 is connected to a source of air flow, such as a fan, to supply heated and/or cooled air (as well as ambient outside air) to an interior compartment of a vehicle. Air is supplied into the rear of the housing 112 through an opening 111 formed by the housing walls 112a–112d and exits through the first opening 116 in the front of the housing 112.

The illustrated air duct outlet 110 includes a louver assembly 118 that is movably mounted within the housing 112. The louver assembly 118 includes a first set of elongated louvers 120 that are in generally parallel, spaced-apart relationship with each other, and a second set of elongated louvers 130 that are in generally parallel, spaced-apart relationship with each other. The louvers in the first and second sets of louvers 120, 130 extend along, and pivot about, respective transverse directions $A_1$, $A_2$. In the illustrated embodiment, the first and second sets of louvers 120, 130 are substantially orthogonal relative to each other.

Pivot axes $A_1$ and $A_2$ may, but need not, lie in the same plane (i.e., coplanar). According to embodiments of the present invention, $A_1$ and $A_2$ may lie in separate, different planes.

Embodiments of the present invention are not limited to the illustrated generally rectangular configuration of the first and second sets of louvers 120, 130. Louvers having various shapes and sizes may be utilized.

The louver assembly 118 is movably secured within a frame 140 that is secured within housing 112. The illustrated frame 140 includes a plurality of resilient members 141 extending from a peripheral portion 140a of the frame that are configured to engage a respective plurality of apertures 145 in the housing walls 112b, 112d and to secure the frame 140 within the housing 112. However, the frame 140 may be secured within the housing 112 in various ways and is not limited to the illustrated embodiment.

The first set of louvers 120 are pivotally secured to the frame 140 via respective pins 121 that extend from each end portion 120a, 120b of each louver 120, as illustrated. Each pin 121 engages a respective aperture 142 formed in frame 140 and defines an axis $A_1$ about which each louver 120 pivots. Apertures 142 are in spaced-apart, adjacent relationship to maintain the desired spacing of louvers 120.

The first set of louvers 120 are movably connected together along end portion 120b thereof via a first connecting member 150. Pivotal movement of any one of the louvers 120 causes pivotal movement of the remaining louvers 120 because of the first connecting member 150. In the illustrated embodiment, the first connecting member 150 has a slender, elongated configuration with a plurality of spaced-apart apertures 152 formed therein. Each aperture 152 is configured to operably engage a respective pin 123 extending from each louver end portion 120b.

Embodiments of the present invention are not limited to the illustrated configuration of the first connecting member 150. A member serving the function of the first connecting member 150 may have various shapes and configurations, and may pivotally connect all (or only some) of the first set of louvers 120 in various ways.

The second set of louvers 130 are pivotally secured to the frame 140 via respective pins 131 that extend from each end portion 130a, 130b of each louver 130, as illustrated. Each pin 131 engages a respective aperture 144 formed in frame 140 and defines an axis $A_2$ about which each louver 130 pivots. Apertures 144 are in spaced-apart, adjacent relationship to maintain the desired spacing of louvers 130.

The second set of louvers 130 are movably connected together along end portion 130b thereof via a second connecting member 160. Pivotal movement of any one of the louvers 130 causes pivotal movement of the remaining louvers 130 because of connecting member 160. In the illustrated embodiment, the second connecting member 160 has a slender, elongated configuration with a plurality of spaced-apart apertures 162 formed therein. Each aperture 0.162 is configured to operably engage a respective pin 133 extending from a respective louver end portion 130b.

Embodiments of the present invention are not limited to the illustrated configuration of the second connecting member 160. A member serving the function of the second connecting member 160 may have various shapes and configurations, and may pivotally connect all (or only some) of the first set of louvers 130 in various ways.

Pivotal movement of the first and second sets of louvers 120, 130 is accomplished via a remotely located joystick 170. Joystick 170 includes a shaft 171 having a proximal end portion 172 and a distal end portion 174. A knob 173 is secured to the proximal end portion 172 of the joystick shaft 171, as illustrated. Distal end portion 174 is configured to engage within slot 175 formed within a first yoke assembly 176, as illustrated. The illustrated first yoke assembly 176 is pivotally connected to opposite panels 194a, 194c that extend rearwardly from the housing 112 in spaced-apart relationship. A pair of pins 177 extending from opposite sides of the first yoke assembly 176 are pivotally engaged with apertures 195 in panels 194a, 194c.

The illustrated first yoke assembly 176 is pivotal about axis $A_3$ (which is substantially parallel with $A_2$), such that movement by a user of the joystick proximal end 172 in the directions indicated by double-headed arrow $A_4$ (i.e., when being used to pivot the second set of louvers about axis $A_2$), causes movement of the second set of louvers 130 via linkage 180. Linkage 180 is connected at a first end 180a to the first yoke assembly 176 via pin 179, and is connected at an opposite second end 180b to a pin 181 extending from one of the louvers 130, as illustrated. Various ways of attaching the linkage 180 to the first yoke assembly 176 and to a louver 130 may be utilized.

A second yoke assembly 190 is pivotally connected to the housing 112 as illustrated. A pin 182 extends from opposite sides 190a, 190b of the second yoke assembly 190. One pin 182 is pivotally connected within a respective aperture 193 in panel 194b extending from the housing 112 adjacent the second opening 117. The other pin (not shown) is pivotally connected within an aperture (not shown) in housing wall 112b. A slot 184 is formed in a portion of the second yoke assembly 190. The joystick proximate end 172 extends through the second yoke assembly 190 and out from slot 184, as illustrated. The joystick 170 is pivotally mounted within the second yoke assembly 190 via pins 178. Pins 178 are pivotally connected within apertures (not shown) within the second yoke assembly 190.

Linkage 196 extends from the second yoke assembly 190 and includes a female connector 197, as illustrated. Female connector 197 is operably connected to a male connector 198 in linkage 199 that is, in turn, connected to a louver 120 in the second set of louvers 120. Embodiments of the present invention are not limited to the illustrated female and male connectors 197, 198. The linkages 196, 199 may be operably connected to each other in various ways as would be understood by those skilled in the art.

Movement of the second yoke assembly 190 via the joystick shaft 171 in the opposite directions indicated by double-headed arrow $A_5$ (FIG. 1) causes movement of the first set of louvers 120. Slot 175 in the first yoke assembly 176 is configured to allow the joystick distal end 174 to move freely without causing movement of the second set of louvers 130 when the joystick 170 is moved along the direction of $A_5$ (i.e., when being used to pivot the first set of louvers about $A_I$).

Movement of the joystick shaft 171 in the opposite directions indicated by double-headed arrow $A^4$ causes movement of the second set of louvers 130. Slot 184 in the second yoke assembly 190 allows the joystick distal end 174 to engage the first yoke assembly 176 and cause the first yoke assembly 176 to pivot, which causes the linkage 180 to move, which causes the second set of lovers 130 to pivot about $A_2$.

Figure 4:
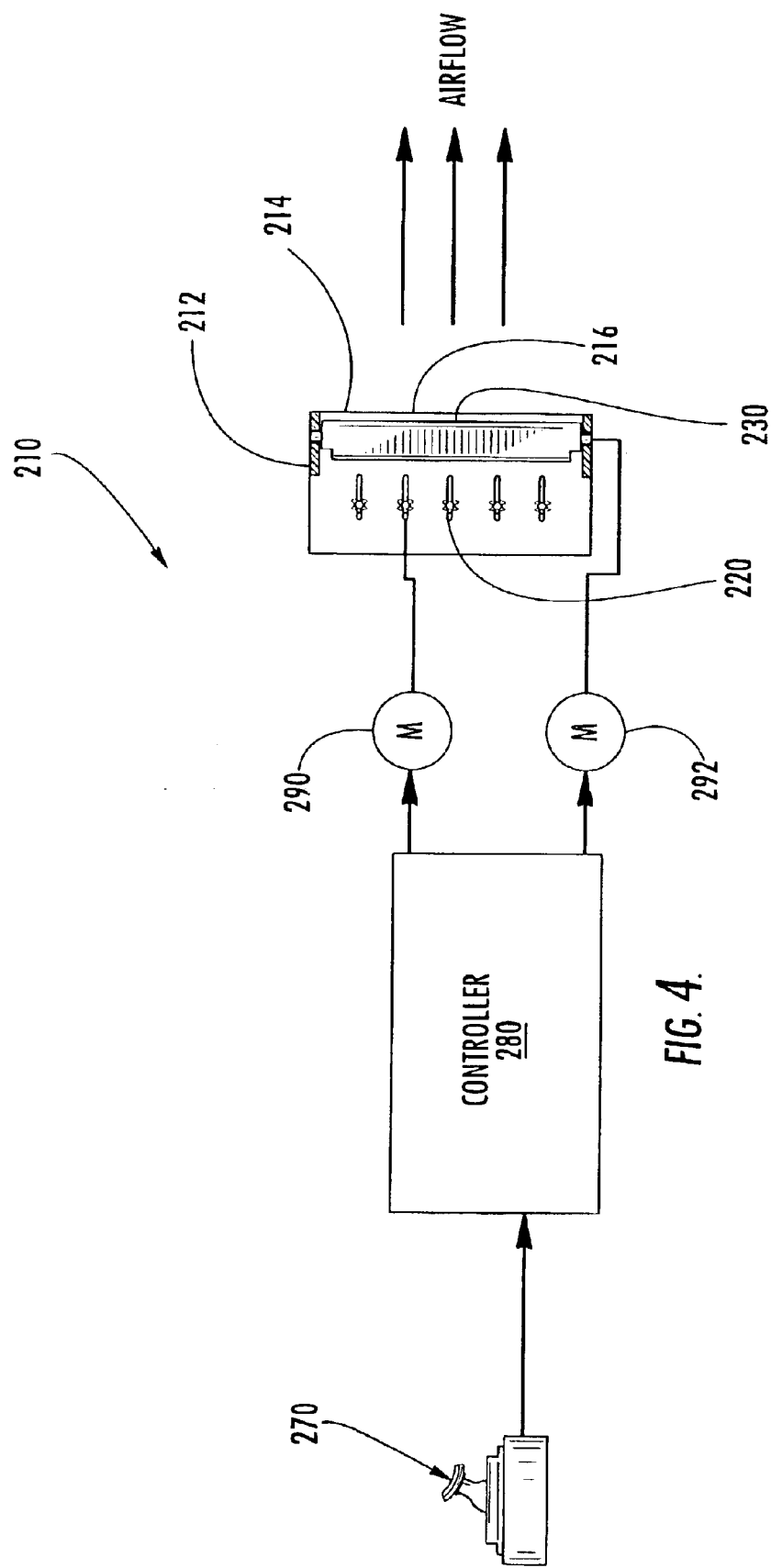
FIG. 4 is a block diagram illustrating an air duct outlet according to other embodiments of the present invention.

Referring now to FIG. 4, an air duct outlet 210 according to other embodiments of the present invention is illustrated. The air duct outlet 210 includes a housing 212 having a front wall 214 with an opening 216 formed therein through which air is allowed to flow. A first set of louvers 220 are pivotally secured within the housing 212 in spaced-apart adjacent relationship. As described above with respect to FIGS. 1–3, the louvers 220 are operably connected together such that pivotal movement of any one of the louvers 220 in the first set causes pivotal movement of the remaining louvers 220 in the first set. A second set of louvers 230 are pivotally secured within the housing 212 in spaced-apart adjacent relationship. The louvers 230 are operably connected together such that pivotal movement of any one of the louvers 230 causes pivotal movement of the remaining louvers 230 in the second set.

A joystick 270 is positioned remotely from the front wall opening 216 such that it does not interfere with air flowing through the front wall opening 216. According to embodiments of the present invention, the joystick 270 may be located virtually anywhere and need not be located adjacent the housing front wall opening 216. For example, when utilized in a vehicle, the joystick 270 may be positioned on an instrument panel of the vehicle remote from the front wall opening 216. The joystick 270 is configured to produce output signals that are responsive to user movement of the joystick. For example, movement of the joystick along the "X" and "Y" axes of an X-Y plane produces respective output signals.

A first servomotor 290 is operably coupled with a louver 220 in the first set of louvers 220 and is configured to cause pivotal movement of the first set of louvers 220 in response to selected user movement of the joystick 270. A second servomotor 292 is operably coupled with a louver 230 in the second set of louvers 230 and is configured to cause pivotal movement of the second set of louvers 230 in response to selected user movement of the joystick 270. A controller 280 is in communication with the joystick 270 and with the first and second servomotors 290, 292. The controller is configured to receive output signals from the joystick 270 and convert them into respective commands for each respective servomotor 290, 292. Accordingly, user manipulation of the remotely located joystick 270 is translated into movement of the first and second sets of louvers 220, 230.

Figure 5:
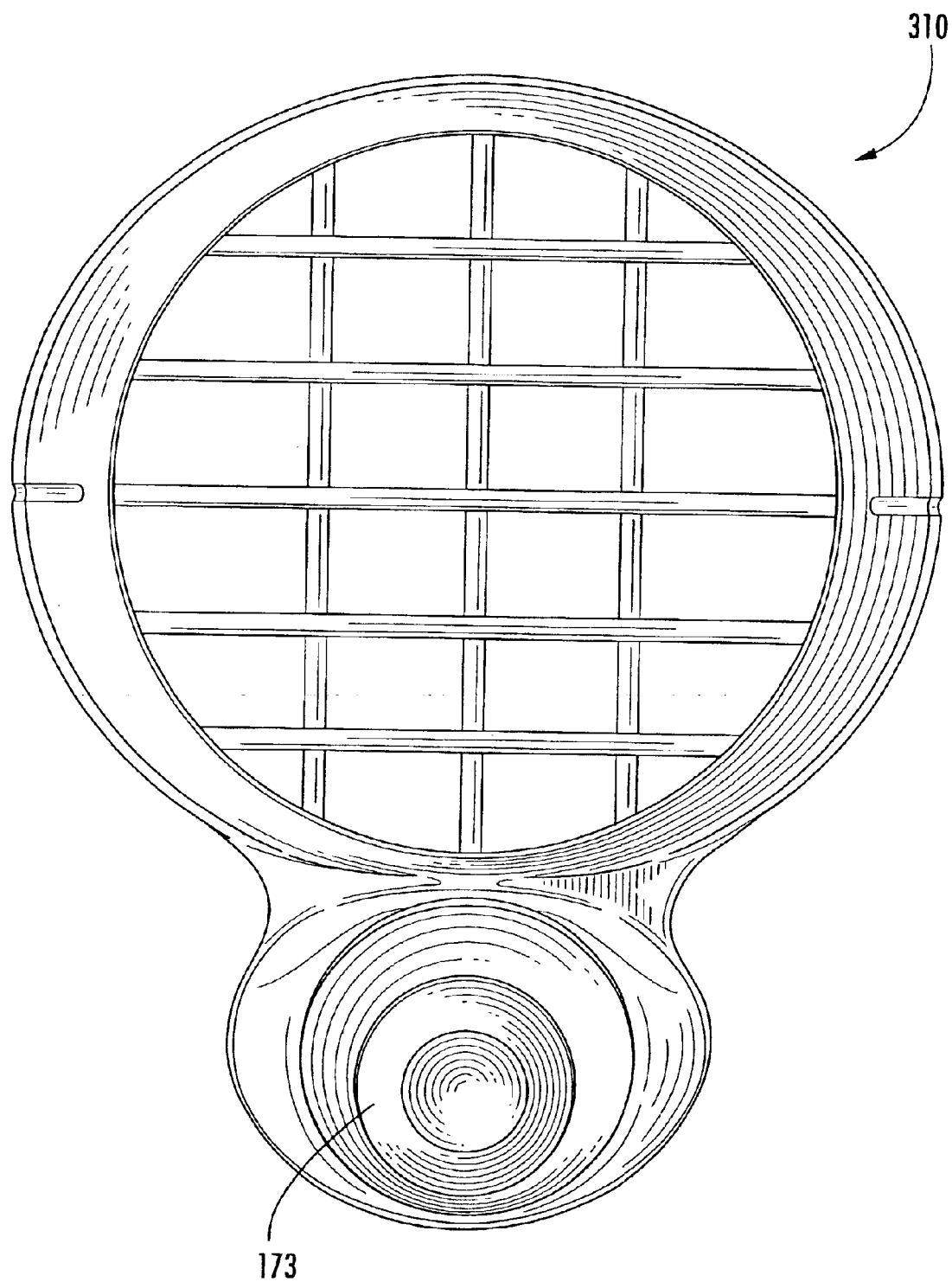
FIG. 5 is a front view of an air duct outlet, according to other embodiments of the present invention.

FIG. 5 is a front view of an air duct outlet 310, according to another embodiment of the present invention. The air duct outlet 310 has a different style and look from the air duct outlet 110 of FIGS. 1–3. However, functionality of the air duct outlet 310 may be the same as described above with respect to the embodiments of FIGS. 1–4. Thus, air duct outlets having remotely-located joystick controls according to embodiments of the present invention may have various styles, shapes and configurations without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An air duct outlet, comprising:
    a housing comprising a front wall having an opening therein through which air is allowed to flow;
    a louver assembly operably coupled with the housing, wherein the louver assembly is configured to adjust a direction of air flowing through the front wall opening, wherein the louver assembly comprises:
        a first set of louvers pivotally secured within the housing in spaced-apart adjacent relationship, wherein the louvers in the first set are operably connected together such that pivotal movement of any one of the louvers in the first set causes pivotal movement of the remaining louvers in the first set; and
        a second set of louvers pivotally secured within the housing in spaced-apart adjacent relationship, wherein the louvers in the second set are operably connected together such that pivotal movement of any one of the louvers in the second set causes pivotal movement of the remaining louvers in the second set; and
    a joystick remotely positioned relative to the front wall opening such that the joystick does not interfere with air flowing through the front wall opening, wherein the joystick is operably coupled with the first and second sets of louvers and is configured to pivot the first and second sets of louvers in response to user movement thereof.

2. The air duct outlet of claim 1, wherein the housing front wall comprises a second opening, and wherein the joystick extends through the second opening.

3. The air duct outlet of claim 1, wherein the louvers in the first set of louvers are substantially parallel with each other.

4. The air duct outlet of claim 1, wherein the louvers in the second set of louvers are substantially parallel with each other.

5. The air duct outlet of claim 1, wherein the louvers in the first set of louvers are substantially orthogonal with the louvers in the second set of louvers.

6. The air duct outlet of claim 1, wherein the second set of louvers are positioned upstream from the first set of louvers within the housing.

7. The air duct outlet of claim 1, wherein the joystick is operably coupled with first and second yoke assemblies, wherein the first yoke assembly is pivotally connected to one of the louvers in the first set, and wherein the second yoke assembly is pivotally connected to one of the louvers in the second set.

8. An air duct outlet, comprising:
a housing comprising a front wall having an opening therein through which air is allowed to flow;
a joystick that produces output signals responsive to user movement thereof; and
a louver assembly operably coupled with the housing, wherein the louver assembly is configured to adjust a direction of air flowing through the front wall opening, wherein the louver assembly comprises:
a first set of louvers pivotally secured within the housing in spaced-apart adjacent relationship, wherein the louvers in the first set are operably connected together such that pivotal movement of any one of the louvers in the first set causes pivotal movement of the remaining louvers in the first set;
a first servomotor operably coupled with a louver in the first set, wherein the first servomotor is configured to cause pivotal movement of the first set of louvers in response to selected user movement of the joystick;
a second set of louvers pivotally secured within the housing in spaced-apart adjacent relationship, wherein the louvers in the second set are operably connected together such that pivotal movement of any one of the louvers in the second set causes pivotal movement of the remaining louvers in the second set; and
a second servomotor operably coupled with a louver in the second set, wherein the second servomotor is configured to cause pivotal movement of the second set of louvers in response to selected user movement of the joystick.

9. The air duct outlet of claim 8, wherein the housing front wall comprises a second opening, and wherein the joystick extends through the second opening.

10. The air duct outlet of claim 8, wherein the louvers in the first set of louvers are substantially parallel with each other.

11. The air duct outlet of claim 8, wherein the louvers in the second set of louvers are substantially parallel with each other.

12. The air duct outlet of claim 8, wherein the louvers in the first set of louvers are substantially orthogonal with the louvers in the second set of louvers.

13. The air duct outlet of claim 8, wherein the second set of louvers are positioned upstream from the first set of louvers within the housing.

14. The air duct outlet of claim 8, wherein the joystick is remotely positioned relative to the front wall opening such that the joystick does not interfere with air flowing through the front wall opening.

15. The air duct outlet of claim 8, wherein the joystick extends from the housing adjacent the front wall opening.

16. An air duct outlet, comprising:
a housing comprising a front wall having an opening therein through which air is allowed to flow;
a joystick that produces output signals responsive to user movement thereof; and
a louver assembly operably coupled with the housing, wherein the louver assembly is configured to adjust a direction of air flowing through the front wall opening, wherein the louver assembly comprises:
a set of louvers pivotally secured within the housing in spaced-apart adjacent relationship; and
a servomotor operably coupled with the louvers, wherein the servomotor is configured to cause pivotal movement of the louvers in response to selected user movement of the joystick.

17. The air duct outlet of claim 16, wherein the housing front wall comprises a second opening, and wherein the joystick extends through the second opening.

18. The air duct outlet of claim 16, wherein the joystick is remotely positioned relative to the front wall opening such that the joystick does not interfere with air flowing through the front wall opening.

* * * * *